United States Patent

[11] 3,615,386

[72] Inventor Bert H. Clampitt
 Overland Park, Kans.
[21] Appl. No. 836,657
[22] Filed June 25, 1969
[45] Patented Oct. 26, 1971
[73] Assignee Gulf Research & Development Company
 Pittsburgh, Pa.

[54] ELECTROCONDUCTIVE ETHYLENE POLYMERS FOR USE IN ELECTROGRAPHIC RECORDING MEDIA
 4 Claims, No Drawings

[52] U.S. Cl. .................................................. 96/1 R,
 96/1.5, 117/201, 117/154, 117/138.8 A, 260/86.7
[51] Int. Cl. ..................................................... G03g 5/10
[50] Field of Search........................................... 96/1.5, 1.8;
 117/201, 17.5, 152, 154; 260/86.7; 162/138

[56] References Cited
UNITED STATES PATENTS

| | | | |
|---|---|---|---|
| 3,116,147 | 12/1963 | Uber et al. .................. | 96/1.8 |
| 3,118,789 | 1/1964 | Wisewell et al. ............... | 96/1.8 X |
| 3,337,517 | 8/1967 | Auspon ........................ | 260/86.7 |
| 3,338,739 | 8/1967 | Rees............................ | 117/138.8 |
| 3,350,372 | 10/1967 | Anspon et al.................. | 260/86.7 |
| 3,479,215 | 11/1969 | Cavagna et al. ............... | 117/201 |
| 3,486,932 | 12/1969 | Schaper et al. ............... | 117/201 |
| 3,493,427 | 2/1970 | Takagi et al. .................. | 117/201 |
| 3,494,903 | 2/1970 | Kochhar........................ | 260/86.7 |

*Primary Examiner*—Charles E. Van Horn
*Attorneys*—Richard L. Kelly, Carl A. Cline, Forrest D. Stine and Richard A. Anderson

ABSTRACT: Ethylene polymers containing pendant alkali metal carboxylate units are employed as a medium for the conductance of electrical charges. Papers coated with such ethylene polymers have particular application in electrographic printing processes.

3,615,386

ELECTROCONDUCTIVE ETHYLENE POLYMERS FOR USE IN ELECTROGRAPHIC RECORDING MEDIA

BACKGROUND OF INVENTION

Conventionally in the preparation of coated papers it is normal to prepare a mixture of water and a pigment such as clay and the like, together with other materials and to blend the mixture with an adhesive material to produce a composition adapted for coating a cellulose webb. The finished product is a paper having a fine degree of gloss, smoothness and with a good finish after calendering.

In the preparation of paper having a printing surface adapted for electrographic printing, it is necessary that a substance having a satisfactory electroconductivity be combined with the paper. Desirably, the electroconductive substance is soluble or at least dispersible in an aqueous medium to form a coating composition that can readily be applied to paper or a cellulose web in a conventional manner.

Among the requirements of paper adapted for electrographic printing, it is necessary that the paper have a conductivity corresponding to a volume resistivity less than about $1,000 \times 10^6$ ohms at ambient temperatures and pressures. Desirably, the paper adapted for electrographic printing will exhibit good electroconductivity at low relative humidity.

Accordingly, an object of the invention is to provide an improved process for the conductance of electrical charges.

Another object of the invention is to provide an improved electrographic printing process.

Other objects, advantages and features of the invention will be really apparent to those skilled in the art from the following description and appended claims.

SUMMARY OF INVENTION

Ethylene polymers containing from 0.05 to 0.5 mol of pendant alkali metal carboxylate units per mol of contained ethylene units are effective as electroconductive mediums. Such ethylene polymers are particularly adapted in an electrophotographic printing processes whereby images are reproduced on paper.

DESCRIPTION OF INVENTION

The ethylene polymers employed in the process of the inventions are those water-insoluble ethylene polymers containing pendant alkali metal carboxylate units. Such ethylene polymers will contain from 0.5 to 0.5 mol (preferably 0.07 to 0.02 mol) of pendant alkali metal carboxylate units per mol of contained ethylene units. Those alkali metals found to be particularly suitable in preparation of the ethylene polymers employed in the invention are potassium and rubidium although the invention is not to be limited thereto. In addition to the pendant alkali metal carboxylate units, the ethylene polymers can contain additional monomeric units such as evidenced by pendant acid or amide units.

The ethylene polymers containing pendant alkali carboxylate units which are employed in the practice of the invention can be prepared by methods known in the art. For example, a suitable method of preparing such ethylene polymers is to saponify an ethylene-alkyl acrylate copolymer by the process disclosed in Canadian Pat. No. 746,066. The teaching of that Canadian Pat. is incorporated herein by reference thereto. A water-insoluble ethylene polymer product is recovered containing pendant alkali metal carboxylate units. Other copolymers which can be employed in preparation of the ethylene polymers of the invention include copolymers of ethylene and esters of an acid of a group comprising maleic, fumaric, and itaconic acids.

By the process described in Canadian Pat. No. 746,066 aqueous dispersions of water-insoluble, self-emulsifiable ethylene polymers containing pendant alkali metal carboxylate units can be obtained.

In one embodiment of the invention, an aqueous dispersion of the water-insoluble, self-emulsifiable ethylene polymer containing pendant alkali metal carboxylate units and cellulose fibers is prepared. A single sheet is cast from the aqueous dispersion comprising a mixture of cellulose fibers and the ethylene polymer containing pendant alkali metal carboxylate units. The product so prepared can be employed in electroconductive processes such as hereafter described.

In a second embodiment, the ethylene polymer containing pendant alkali metal carboxylate groups can be applied to the surface of paper by the method described in copending application, Ser. No. 710,396 filed Mar. 4, 1968 by Harry D. Anspon and Jack Hurst. As described therein, the paper is brought into contact with a roller coated with the ethylene polymer to obtain a paper product containing a coating of the ethylene polymer.

In the preparation of coated paper having a printing surface adapted for electrographic printing, the bottom surface of the paper can be given a coating of the above-described ethylene polymer, thereby providing for the conductance of electrical charges from the paper. Under such circumstances, the paper will contain a coating of the ethylene polymer having a thickness normally at least about one-half mil and preferably 1 to 5 mils. Although normally the coating will have a thickness of at least one-half mil, it will be appreciated by those skilled in the art that in this embodiment it is necessary only that coating be continuous. In particular applications, it may be desirable to coat both surfaces of the paper with the electroconductive ethylene polymers of the invention.

Although the invention has been heretofore described as applied to the coating of paper and the preparation of sheets comprising a mixture of cellulose fibers and ethylene polymer, it is not intended that the invention should be limited thereto. It will be readily apparent to those skilled in the art that various other substrates can be coated with the ethylene polymer wherein said substrates are to be subsequently employed in processes wherein it is desired to transfer electrical charges to or from the substrate. Other substrates which can be suitably coated with the ethylene polymer of the invention includes wood, cellophane, cellulose esters, cellulose ethers, metals, glass, thermoplastic polyesters, thermoplastic polycarbonates, polyurethanes, thermoplastic formaldehyde homopolymers and copolymers, thermoplastic polyamides, polyvinylalcohol, thermoplastic addition polymers having polymerized therein at least 25 mol percent of at least one monomer selected from the group consisting of two to four carbon atom mono-olefins, vinyl halides, vinylidiene halides, styrene and substituted styrenes, esters of acrylic and alpha-alkyl substituted acrylic acids. The substrates employed in the inventive process can be nonfibrous or fibrous. The fibrous substrates can be woven or nonwoven and includes synthetic fibrous material or natural fibers such as cotton, flax, hemp, jute, silk, wool, fur, hair of all types, and the like.

In addition to coated substrates, the electroconductive ethylene polymers of the invention can be cast in the form of a film or other suitable shapes and the solid ethylene polymers so prepared employed in a process for conducting electrical charges.

In a typical electrostatic process for reproducing images on paper, the paper contains a top semiphotoconductive coating. An intermediate coating comprising an ethylene polymer containing pendant alkali metal carboxylate units is positioned below the photoconductive coating and adjacent the top surface of the paper by a process such as described above. The paper so prepared is placed in a dark chamber and subjected to an overall electronic charge. The charged paper is then exposed to a projected image, and electrons are dissipated where light strikes the paper. The remaining electronic image is developed with charged "ink" particles, yielding an immediately visible image which can be rendered permanent by fusing the "ink" into the paper surface with heat. Electrical charges are dissipated from the paper by being conducted through the electroconductive ethylene polymer medium.

The following examples are presented to illustrate the objects and advantages of the invention. However, it is not intended that the invention should be limited to the specific embodiments described therein.

EXAMPLE I

An ethylene-methyl acrylate copolymer (20.0 weight percent methyl acrylate) was saponified to obtain an ethylene polymer wherein all of the pendant acrylate units had been converted to the potassium salt. The ethylene polymers so prepared was then coated on registered bond paper at various coat weights shown below in table 1 and the surface electrical conductivities of the coated paper were measured. The resistivity measurements in this and succeeding examples were obtained by positioning ⅛-inch aluminum electrodes on opposite sides of a 1-inch square paper sample coated with the electroconductive ethylene polymer. The aluminum electrodes were connected to a vacuum tube voltmeter.

TABLE 1

| Ethylene Polymer Coat Weight (lbs./3,000 sq. ft.) | Resistance—meg ohm/sq.in. | | |
|---|---|---|---|
|  | 10% RH | 50% RH | 90% RH |
| 5 | 100 | 300 | 4 |
| 6 | 700 | 150 | 7 |
| 8.8 | 300 | 15 | 3 |

From the above it is apparent that the surface resistivities of the paper coated with the ethylene polymer at the condition of low relative humidity is substantially below the 1,000 meg. ohm upper limit and therefore can satisfactorily be employed in electrographic processes.

EXAMPLE II

Aqueous dispersions of ethylene-alkali metal carboxylate polymers were prepared by the saponification process described in example I. In each case an ethylene-methyl acrylate (20 weight percent methyl acrylate) copolymer was saponified to produce an ethylene polymer wherein all of the acrylate ester units had been converted to the alkali metal carboxylate units to produce the salts of table 2. The polymers were coated on Texcote stock paper at a level of 4 pounds per 3,000 square feet and surface electrical conductivities were measured by the test procedure of example I under different relative humidity conditions with the results shown in table 2.

TABLE 2

| Alkali Metal in Ethylene Polymer | Resistance—(meg ohms/sq.in.) | | | |
|---|---|---|---|---|
|  | 11% RH | 31% RH | 51% RH | 75% RH |
| Sodium |  |  | 150 | 125 |
| Potassium |  | 1,000 | 100 | 50 |
| Rubidium | 1,000 | 100 | 30 | 100 |
| Cesium | 500 | 50 | 30 | 50 |

The results noted above in table 2 demonstrate the particular effectiveness of the ethylene polymers containing potassium, rubidium and cesium in the conductivity of electrical charges when coated on paper.

EXAMPLE III

Aqueous dispersions of ethylene-methyl acrylate (20 weight percent methyl-acrylate) polymer wherein essentially all of the acrylate groups have been converted to the alkali metal carboxylate units were cast as free films and the electrical conductivities of the films measured by the test procedure of example I. The results at different relative humidity levels are shown below in table 3 for the sodium and potassium acrylate polymers.

TABLE 3

| Relative Humidity | Resistance—ohms/sq. in. | |
|---|---|---|
|  | Sodium | Potassium |
| 31% |  | 30,000,000 |
| 51% | 35,000,000 | 2,000,000 |
| 75% | 1,000,000 | 300,000 |
| 88% | 400,000 | 50,000 |

The above data clearly demonstrates the effectiveness of ethylene-polymers when cast into free films to conduct electrical charges.

EXAMPLE IV

The aqueous dispersions of example III were precipitated with acetone and compression moldings made from the dried polymers. Surface conductivities of the molded samples were measured by the test procedure of example I and the results indicated below in table 4.

TABLE 4

| Relative Humidity | Resistance—(ohms/sq. in.) | |
|---|---|---|
|  | Sodium | Potassium |
| 11% |  | 5,000,000 |
| 31% |  | 10,000,000 |
| 51% | 500,000,000 | 3,500,000 |
| 75% | 1,250,000 | 500,000 |
| 88% | 200,000 | 60,000 |

The above data demonstrates the effectiveness of ethylene-polymers to conduct electrical charges in low relative humidity atmospheres and atmospheres of high relative humidity and further demonstrates that moldings of the ethylene polymer are effective in the transmission of electrical charges.

Although the invention has been described with reference to specific materials, embodiments and details, various modifications and changes, within the scope of this invention, will be apparent to one skilled in the art and are contemplated to be embraced in the invention.

I claim:

1. In an electrographic process for reproducing images on paper which comprises the steps of placing an image-defining electrostatic charge on one surface of a dielectric layer disposed on a conductive substrate; the improvement which comprises employing as the conductive substrate an electroconductive material consisting essentially of an ethylene polymer containing pendant alkali metal carboxylate units on at least one surface of said paper, said ethylene polymer comprising ethylene and a comonomer selected from the group consisting of esters of acrylic, methacrylic, maleic and fumaric acids wherein at least a portion of the pendant ester units have been converted to alkali metal carboxylate units, the concentration of said alkali metal carboxylate units being in the range of 0.05 to 0.5 mol per mol of contained ethylene units.

2. The process of claim 1 wherein said ethylene polymer comprises an ethylene-alkyl acrylate copolymer wherein at least a portion of the pendant ester units have been converted to alkali metal carboxylate units.

3. The process of claim 1 wherein the alkali metal is selected from the group consisting of potassium and rubidium.

4. The process of claim 1 wherein the thickness of said coating is in the range of 1 to 5 mils.

* * * * *